No. 628,847. Patented July 11, 1899.
D. M. QUARLES, Jr.
FISHING REEL.
(Application filed July 19, 1898.)
(No Model.) 2 Sheets—Sheet 1.
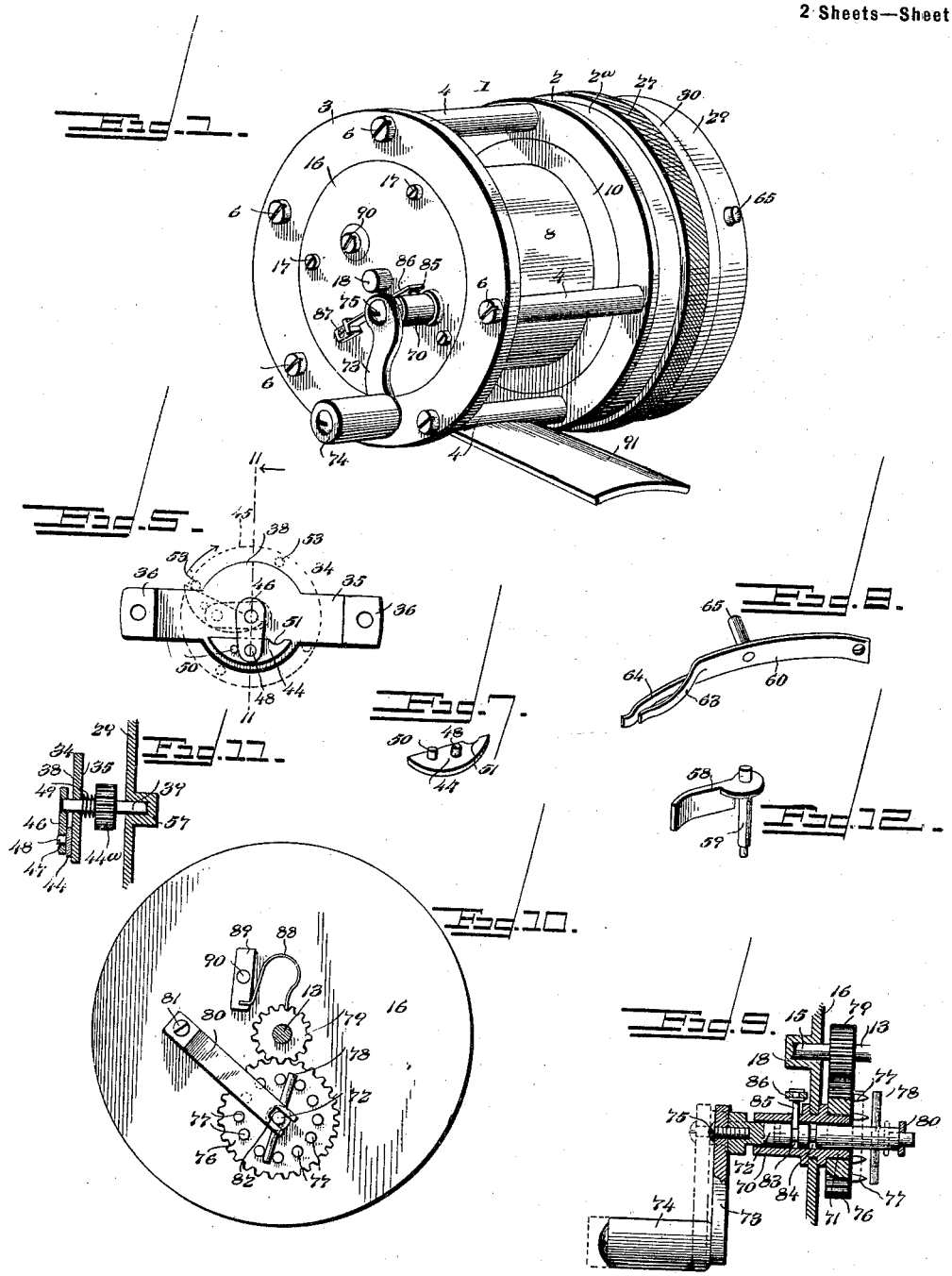

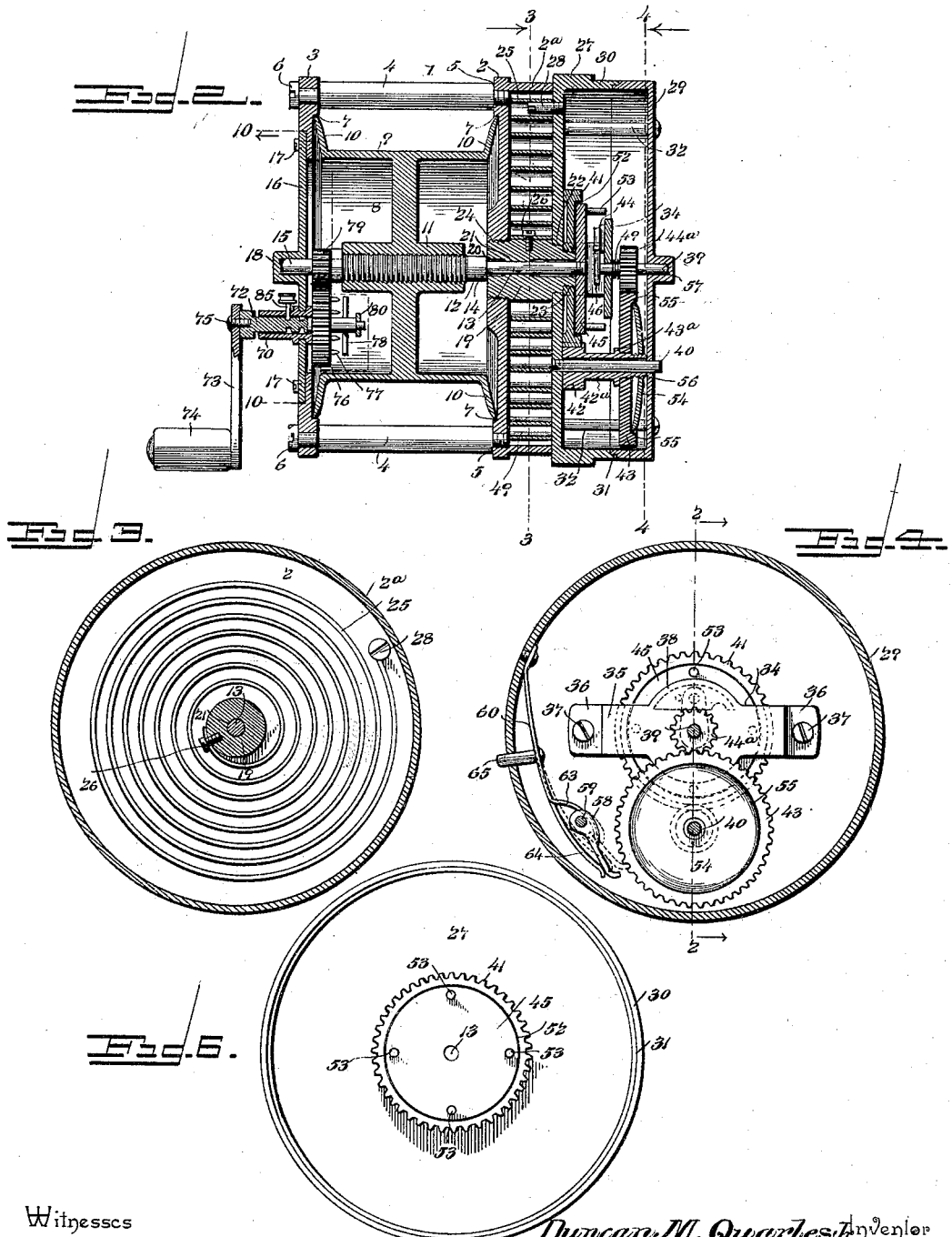

UNITED STATES PATENT OFFICE.

DUNCAN M. QUARLES, JR., OF CLARKSVILLE, TENNESSEE.

FISHING-REEL.

SPECIFICATION forming part of Letters Patent No. 628,847, dated July 11, 1899.

Application filed July 19, 1898. Serial No. 686,364. (No model.)

*To all whom it may concern:*

Be it known that I, DUNCAN M. QUARLES, Jr., a citizen of the United States, residing at Clarksville, in the county of Montgomery and State of Tennessee, have invented a new and useful Fishing-Reel, of which the following is a specification.

My invention relates to improvements in fishing-reels of that class wherein a line-spool is used in connection with the winding-spring, which may be operatively connected at any suitable time with the line-spool to control the rotation thereof and cause the line to exert resistance to the movement of the fish; and the primary object of the invention is to provide a simple, strong, and efficient structure by which a fish may be hooked, played, broken down, and drawn in automatically through the action of the mainspring on the line-spool and at the same time continually keep a tight line on the fish.

A further object of the invention is to mount the line-spool in such relation to the mainspring and the operating-crank that said spool is perfectly poised at all times to rotate with freedom when unclutched from the train of gearing controlled by the mainspring and the operating crank-shaft, thereby making the reel a perfect bait-casting device in which there is no hindrance, practically, to the free play of the line as it is uncoiled from the spool.

A further object of the invention is to provide an improved construction of automatic centrifugal clutch between the mainspring-gearing and the line-spool arbor in which the elements are simple and efficient and are controlled wholly by the tension of the main spring.

A further object of the invention is to provide an improved crank-shaft device which may be quickly and readily released from the line-spool arbor to render the latter free and unobstructed in its action, but which permits the crank and its gearing to be operatively connected with the line-spool arbor for rotating the latter by hand in the same manner and with the same facility as an ordinary multiplying-reel.

With these ends in view the invention consists in the novel combination of elements and in the construction and arrangement of parts, which will be hereinafter fully described and claimed.

To enable others to understand the invention, a preferred embodiment thereof is illustrated by the accompanying drawings, forming a part of this specification, and in which—

Figure 1 is a perspective view of a fishing-reel constructed in accordance with my invention. Fig. 2 is an enlarged vertical sectional view taken centrally through the reel in the direction of the line-spool arbor, the plane of section being indicated by the dotted line 2 2 of Fig. 4. Fig. 3 is a vertical transverse sectional elevation through a part of the mainspring-drum on the plane indicated by the dotted line 3 3 of Fig. 2 looking in the direction indicated by the arrow. Fig. 4 is a vertical sectional view somewhat similar to Fig. 3, but taken on the plane indicated by the dotted line 4 4 of Fig. 2 and looking in the direction indicated by the arrow. Fig. 5 is an enlarged detail face view showing the bridge-plate in its inverted position when detached from the spring-actuated drum and illustrating the driving member of the clutch between the train of spring-controlled gearing and the spindle of the line-spool arbor. Fig. 6 is a face view of the driven member of the clutch between the line-spool arbor and the train of gearing controlled by the mainspring. Fig. 7 is a detail perspective view of the centrally-pivoted clutch-arm. Fig. 8 is a detail perspective view of the manual detent and its spring for the train of gearing between the mainspring and the line-spool. Fig. 9 is an enlarged detail sectional view through the crank-shaft by which the line-spool may be actuated by hand. Fig. 10 is a detail sectional view on the plane indicated by the dotted line 10 10 of Fig. 2 looking in a direction toward the removable cap-plate of the reel frame or housing. Fig. 11 is a detail transverse section through the parts shown by Fig. 5 on the plane indicated by the dotted line 11 11 of said Fig. 5. Fig. 12 is a detail perspective of the detent-pawl with which is associated the spring shown by Fig. 8.

Like numerals of reference denote like and corresponding parts in each of the several figures of the drawings.

The frame or housing of the improved reel is indicated in its entirety by the numeral 1, and it consists of the main plate 2, the ring or annulus 3, and the posts 4. The ring and main plate are spaced apart a suitable distance to accommodate between themselves the line-spool, and said ring and plate are concentric with each other. These parts are joined rigidly and firmly together by the series of posts 4, and the posts are shouldered, as at 5, and united rigidly to the main plate 2, while the other ends of the posts are socketed in the ring 3 and firmly secured thereto by the short screws 6. In the opposing faces of the main plate 2 and the ring 3 of the reel-housing are formed the concentric guide recesses or grooves 7, which accommodate the edges of the line-spool heads or end plates, and said line-spool is thus arranged compactly and snugly within the reel-housing, whereby the line is prevented from catching in the spool during the rotation thereof to coil or uncoil the line.

The line-spool 8 is cast in a single piece of metal, and it consists of a barrel 9, the heads or end plates 10, and the sleeve-like hub 11. The heads or end plates of the line-spool are of dished or flared form to provide recesses in the ends of the spool, and at one end this spool accommodates the multiplying-gearing between the crank-shaft and the spool-arbor, thus housing certain of the operating devices within the line-spool itself and protecting them from injury and accumulations of dirt. The line-spool arbor 12 passes through the sleeve-hub 11 of the spool 8, and the parts are rigidly joined or secured together. One end of this arbor 12 is extended beyond the hub of the spool for a suitable distance, nearly to the main plate 2 of the reel-housing, and at this point the spindle is reduced to form the shoulder 14 and the extended spindle 13. The spindle 13 is prolonged considerably beyond the shouldered end 14 of the arbor 12, so as to extend through a bushing and into the chamber of a spring-actuated drum, as will presently appear, and this shoulder 14 of the arbor 12 is properly supported within the bushing to enable the arbor and spool to rotate freely and operatively within the housing. The other end of the arbor 12 is extended or prolonged beyond the hub 11 of the line-spool, and its extremity provides a pintle 15, which is properly fitted in a cap-bearing 18 on the cap-plate 16. This cap-plate is applied laterally against the outer exposed face of the ring 3, forming a part of the reel-housing, and said cap-plate serves to close the central opening of the ring, to which it is firmly but detachably secured by the short screws 17. The cap-bearing 18 for the pintle 15 of the line-spool arbor is closed at its outer end, and thereby forms a thrust-bearing for the arbor 12. From the foregoing description it will be obvious that both ends of the line-spool arbor are supported in proper bearings on the reel-housing or parts attached thereto, and said bearings are fashioned to take up the end thrust of the arbor, whereby the line-spool is perfectly poised within the reel-housing to rotate with extreme freedom therein.

The bushing heretofore referred to is indicated by the numeral 19, and it is attached firmly to the main plate 2 of the reel-housing in axial relation to the line-spool arbor. This bushing extends across the spring-chamber formed by an annular flange $2^a$ on the main plate of the reel-housing, and said bushing is externally threaded for a part of its length for the purpose of screwing it into a central threaded opening of the main plate 2, thereby firmly attaching the bushing to the main plate. Through the bushing extends an axial bore or passage 21, and at opposite ends of the bushing this bore is enlarged, as at 20. The bore or passage 21 serves as the journal-bearing for the reduced spindle 13 of the line-spool arbor, and the shoulder 14 of said arbor is arranged to bear against one end of the bushing, as shown by Fig. 2, thus properly supporting the arbor for free rotation in the bushing and the shoulder serving to hold the arbor against endwise movement in one direction in the bushing. The bushing, at its end opposite to the main plate, is reduced somewhat and made smooth externally to form a shouldered bearing 22, on which the spring-actuated drum is loosely fitted for free rotation, and this shouldered bearing of the bushing passes through the inner member of the spring-actuated drum, so that its extremity extends into said drum. This extremity of the fixed bushing 19 is reduced and externally threaded to provide a threaded tenon 23, on which is screwed the fast member of a train of gearing between the line-spool arbor and the spring-actuated drum, and this fast member of the gearing serves to hold the spring-actuated drum against endwise displacement on the shouldered bearing 22 of the bushing. The external thread, by which the bushing is made fast to the main plate 2 of the reel-housing, is indicated by the numeral 24 and, as before explained, the threaded inner end 24 of the bushing is screwed into a threaded central opening of the main plate 2. The bushing 19 lies centrally to the main plate 2 and concentric with the annular flange $2^a$ thereof, thus providing a spring-chamber on the outer side or face of the main plate. The outer open side of this annular chamber formed by the main plate and its flange is designed to be closed by the rotatable spring-actuated drum 27, which is applied to said open end of the chamber and is properly fitted to the shouldered bearing 22 of the fixed bushing.

The mainspring 25 is a powerful helical spring compactly fitted within the flange $2^a$ of the main plate and coiled around the fixed bushing 19, and the inner end of this helical mainspring is firmly attached to the bushing in a suitable way—as, for instance, by the screw 26—which passes through an opening in the spring and is received within a socket of the fixed bushing.

The spring-actuated drum 27, which is operatively fitted to the shouldered bearing of the bushing and against the annular flange of the main plate 2, is divided transversely to produce two sections 29 and 30, which are detachably and rigidly coupled together, as will presently appear, and the disk or plate of the inner drum-section 30 is the part that is loosely fitted on the shouldered bearing 22 of the bushing. This inner member of the spring-actuated drum has the outer end of the mainspring fastened thereto by means of a post 28, which is rigidly secured to said section 30 of the drum and extends inwardly into the spring-chamber for said outer end of the spring to be secured thereto. The two sections 29 30 of the spring-actuated drum are closely fitted together by a lap-joint 31 between the flanges of said sections, and the sections are united together detachably by the series of posts 32. The two sections of the drum form within themselves a chamber in which is contained the train of gearing and the clutch mechanism by which the mainspring may be operatively connected with the extended spindle 13 of the line-spool arbor, and to support the clutch and certain parts of the gearing I employ the bridge-plate 34. This bridge-plate is struck up of a single piece of metal to form the offset 35 and the feet 36, and said bridge-plate is arranged to span the inner end of the spindle 13, forming a part of the arbor 12. The feet 36 of the bridge-plate are fitted firmly against the inner section 30 of the spring-actuated drum and are secured firmly thereto by the short screws 37. The offset 35 of the bridge-plate is formed or provided with a rigid disk bearing 38, which is on the inner side or face of the offset 35 and is in axial relation to the spindle 13 of the spool-arbor. In a central opening of the bridge and the disk bearing 38 thereon is loosely fitted an arbor 39, which is adapted to rotate and to slide freely in the bridge-plate and the bearing, and this arbor 39 is in axial relation to the line-spool arbor 12. The inner part of this arbor 39 is contiguous to the extremity of the spindle 13, which forms a part of the arbor 12 for the line-spool, and the outer end of said arbor 39 is loosely fitted in an end bearing 57, which is rigidly secured to the outer section or member 29 of the two-part spring-actuated drum 27. At one side of the fixed bridge and the arbor 39 and within the chamber of the spring-actuated drum is arranged a spindle 40, the inner end of which is rigidly fastened to the inner section 30 of said drum.

41 designates the stationary gear, forming a part of the train of gearing between the spring-actuated drum and the spool-arbor 12. This stationary gear 41 is provided with a central opening, which is interiorly threaded, and is screwed upon the threaded tenon 23 of the fixed bushing 19, and through said opening of the stationary gear 41 passes the extremity of the spindle 13. A compound gear 42 43 is constructed with a tubular shaft $42^a$, one member, 42, of the compound gear being rigid with one end of the tubular shaft, while the other member, 43, is held by friction devices on said tubular shaft. The tubular shaft is fitted loosely on the fixed spindle 41, and its small gear member 42 meshes with the stationary gear 41, while the large gear member 43 meshes with a gear-pinion $44^a$, which is rigidly secured or attached to the slidable arbor 39. Between the inner end of the arbor 39 and the extremity of the spindle 13, forming a part of the line-spool arbor, is arranged an automatic centrifugal clutch, consisting of the members 44 and 45. The driven clutch member 45 is rigidly attached to the extremity of the spindle 13, while the driving clutch member 44 is mounted on the inner end of the arbor 39 for centrifugal play or movement thereon within certain limits. The driving clutch member 44 is in the form of a plate which is fitted loosely between the disk bearing 38 and a clutch-arm 46, which is rigidly fastened to the arbor 39, to extend rigidly therefrom and terminate within the edge of the disk bearing 38. This driving clutch member is fitted loosely on the clutch-arm 46 by having its pin 48 fit loosely in an aperture 47 of the clutch-arm 46, and said clutch member 44 is held in position between the arm 46 and the disk bearing by a spring 49, which is coiled around the arbor 39 to have one end thereof bear against the offset 35 of the bridge-plate, and its other end is seated against the gear-pinion $44^a$ on the arbor 39, whereby the spring normally impels the arbor endwise to draw the arm 46 toward the bearing 38 and confine the driving clutch member 44 loosely in place between the arm 46 and said disk bearing 38. This loosely-mounted clutch member 44, which is controlled by centrifugal force under the influence of the mainspring, is adapted to have one end thereof projected outwardly beyond the edge of the disk bearing 38, and this outward movement of the loose clutch member 44 is limited by a recessed part 51 coming in contact with the arbor 39. The inward movement of the centrally-pivoted driving clutch member 44 is arrested at a point within the limit of the edge of the disk bearing 38 by a stop-pin 50, which is rigidly attached to the clutch member 44 in a position to abut against one edge of the radial clutch-arm 46; but this stop-pin does not interfere with the outward movement of the clutch member under centrifugal force, due to the rapid rotation of the spring-actuated drum controlled by the mainspring.

The driven clutch member 45 is in the form of a disk, which is rigidly attached to the extremity of the spindle 13, and this disk 45 is fitted snugly in a recess 52, formed in the exposed face of the stationary gear 41 of the train of gearing. The driven clutch member is thus made fast with the line-spool arbor, and it is in compact relation to the driving clutch member 44 and the gear 41. Said driven clutch member 45 is provided with a series of outwardly-extending pins or studs 53, which project beyond the edge of the disk bearing 38 on the fixed bridge, and said driven clutch member is thus arranged to rotate freely with the line-spool and its arbor when the driving clutch member 44 lies within the edge of the disk bearing 38. The clutch member 44 is, however, adapted to be thrown radially to a position where its protruding end will engage with one or the other of the pins or studs 53 on the driven member 45, and thus the two clutch members may be operatively connected together for the purpose of placing the arbor 12 and the line-spool under the influence of the mainspring, which acts through the drum 27 and the train of gearing on the spindle 13 of the line-spool arbor 12.

The tubular shaft 42ª, carrying the members of the compound gear, fits idly on the spindle 40, and one gear member 43 is held under tension of a spring brake-disk 54, which is struck up from a single piece of metal in concavo-convex form. This gear member 43 is fitted loosely on a shouldered end 43ª of the tubular shaft 42ª, and the tension-disk 54 is fixed rigidly to the extended threaded end 43ª of said shaft 42ª, said disk having its edge fitted in a facial recess 55 of the gear 43. This friction spring-disk serves as a friction-brake to the idler-gear to prevent stripping of the gear-teeth under certain conditions of rigid resistance in the service of the reel.

58 designates a controlling-detent which is adapted to be operatively engaged with the member 43 of the compound gear between the fixed gear 41 and the rotary gear 44ª on the arbor 39. This controlling-detent consists of a pawl which is fast to a shaft 59, mounted in the sections 29 and 30 of the spring-actuated drum, and with this detent-pawl is operatively connected a leaf-spring 60, situated within the spring-actuated drum and having one end rigidly fastened to the peripheral flange of one section of said drum. The free end of this spring is forked or bifurcated to provide two arms 63 and 64, and one arm, 64, is bent to overhang the pivoted pawl 58, while the other, 63, is bent under the pivotal shaft of the pawl and engages with the opposite side of said pawl. The arm 63 is stronger than the arm 64, and to the spring 60 is attached a push-pin 65, which is adapted to play in an opening in the annular flange of the drum member 29. As this detent-pawl is carried by the rotatable spring-actuated drum, the push-pin may be forced inwardly for the pawl to be pressed against the tension of its holding-spring 60, thereby causing the pawl to engage with the gear member 43 and hold the barrel against rotation on the reel-housing when the mainspring is wound up. After the mainspring has been placed under tension the drum may be allowed to rotate backwardly a few turns, and when the operator presses inwardly on the push-pin the detent-pawl engages with the gear 43 to hold the drum fast; and simultaneously with this operation the loose centrally-pivoted clutch member 44 will be thrown outwardly beyond the edge of the disk bearing 38, thereby moving it to a position to engage with one or the other of the pins on the driven clutch member 45. The mainspring is thus connected through the drum, the gearing, and the clutch with the line-spool. Now, if a pull or jerk is exerted on the line in one direction—as, for instance, by the struggle of a fish in an effort to free itself from the hook—motion will be imparted through the spool, its arbor, and the train of gears to the pinion 43, and the pawl will be released from said gear 43, so that the full force of the mainspring will be thrown on the line-spool.

I have also equipped my reel with a crank-shaft and multiplying-gear by which the line-spool may be rotated, and to properly support the crank-shaft we provide a fixed tubular bearing 70 on the cap-plate 16, the inner end of said bearing 70 being extended through the plate 16 to form a shoulder 71. A crank-shaft 72 is fitted loosely in this tubular bearing 70 to rotate freely therein and to move endwise for the purpose of throwing the shaft into and out of gear with the line-spool arbor, and to the outer end of this shaft 72 is fitted a crank-arm 73, having a handle 74, which is slipped over the end of the shaft and is held in place by a screw 75, which enters a socket in the extremity of the shaft and has its head arranged to bear against the crank-arm. A gear-wheel 76 is fitted loosely on the shoulder 71 of the tubular bearing on the inside of the reel-housing, and this gear-wheel is provided with a series of clutch-pins 77, which are arranged parallel to the axis of the shaft and extend in circular series around the same. The gear-wheel 76 is supported on the bearings 70 independent of the shaft 72, which is adapted to slide loosely through said gear-wheel, and the inner end of this shaft is provided with a transverse clutch-pin 78, which extends in opposite directions beyond the shaft and is adapted to engage with any two of the clutch-pins 77 on diametrically opposite sides of the shaft. The shaft 72 may be forced inwardly through the tubular bearing 70 for the radial clutch-pin 78 to clear the extremities of the clutch-pins 77, thus freeing the shaft and its pin 78 from the gear 76 or its pins 77, but when the shaft is drawn outwardly the clutch-pin 78 thereon is adapted to engage with two of the clutch-pins on the gear 76, thus making the gear fast with the shaft and causing the shaft and gear to rotate together. This gear 76 is in mesh with a gear-pinion 79, which is secured rigidly to the pintle 15 of the line-spool arbor, and when the crank-shaft is clutched to the gear 76 the rotary motion of the shaft will be communicated to the line-spool arbor to rotate the line-spool. It is evident that the crank-shaft may be unclutched from the gear 76, and thus the line-spool may rotate freely without hindrance from the crank-shaft. To the inner face of the cap-plate 16 is rigidly secured an irregular leaf-spring 80, which is fastened at one end by means of a screw 81, and the free end of this pressure-spring 80 is forked or slotted, as at 82, for operatively connecting the spring to the crank-shaft, so that the latter may rotate freely without hindrance from the spring, which normally exerts its tension to hold the shaft in a position where its radial clutch-pin 78 will engage with the pins on the gear 76. This pressure of the spring 80 is restrained by the action of a locking device which may fit in either of the grooves 83 84, which are provided circumferentially on the crank-shaft 72 at suitable points from each other. In either of these grooves is adapted to fit a locking-pin 85, which passes through a suitable opening in the tubular fixed bearing 70, and this locking-pin is carried by a spring-arm 86, the heel of which is fastened to the cap-plate 16 by means of a screw 87. This locking-spring 86 is readily accessible from the outside of the reel-housing for the purpose of retracting the pin 85 from one of the grooves, and thus the shaft may be forced outwardly by the pressure of its spring 80 or it may be pushed inwardly by hand, the locking device serving to hold the shaft in either of its positions.

The drag for checking the rotation of the line-spool is in the form of a leaf-spring 88. (See Fig. 10.) One end of this spring is arranged to engage with one member of the multiplying-gear between the crank-shaft and the line-spool arbor, preferably the gear-pinion 79. This drag-spring is attached to the carrying-block 89, which is supported on the cap-plate 16 by an adjusting-screw 90, the headed and notched end of which is accessible from the outside of the reel-housing.

As is usual in the art, a saddle-plate 91 is secured rigidly to two of the connecting-posts 4, between the main plate and the ring 3 of the reel-housing, and this saddle-plate provides means by which the reel may be attached to the pole.

The improved fishing-reel has all of its operating parts supported on a simple and strong construction of housing, and the line-spool is poised within the reel so as to rotate with great freedom therein, thus making the reel well adapted as a bait-casting device. The detent-pawl and the crank-shaft may be adjusted to free the mainspring and the multiplying-gearing from the line-spool, thus contributing to the freedom of rotation of said line-spool. By placing the mainspring under tension, which is effected readily by rotating the drum, which is loosely coupled to the main plate of the housing, and adjusting the controlling-detent 58, the drum may be held from rotation; but by permitting the drum to rotate backwardly a few turns the full force of the mainspring may be exerted on the line-spool when strain is exerted on the line sufficiently to uncouple the gear 43 from the detent-pawl. The reel is thus well adapted for automatic operation according to the strain which may be exerted on the line-spool by the efforts of the fish hooked to the end of the line.

It will be observed that the improved reel combines in a simple structure the desired features of an automatic tension device and a means by which the line-spool may be controlled by hand, and all the working parts or devices of the structure are housed or arranged compactly with relation to the line-spool.

It will be understood that the rotatable drum carries with it the train of gearing, except the gear which is fixed to the bushing, and that said drum is controlled by the mainspring, which is housed within a stationary part of the reel-frame or housing. The gearing serves to multiply the number of rotations of the line-spool, and the spring offers resistance to the pull on the line against the movements of the fish, so as to keep at all times the necessary tautness, and thus obviate slackening and entanglement of the line. The compound gear has its member 43 pressed against the shouldered end of the tubular shaft by the friction-spring plate with sufficient force to insure rotation of the gear 43 with the shaft and the gear member 42 to insure rotation of the gears 42 43 with said shaft; but in the event of rigid resistance to the rotation of the gears 42 43 the friction-disk yields sufficiently for the gear 43 to slip on the shaft 42$^a$, and thus obviate stripping of the gear-teeth.

Slight changes may be made in the form of some of the parts while their essential features are retained and the spirit of the invention embodied. Hence I do not desire to be limited to the precise form of all the parts as shown, reserving the right to vary therefrom.

Having thus described the invention, what I claim is—

1. In a fishing-reel, the combination with a housing, a mainspring-actuated drum and a line-spool arbor, of gearing between the spring-actuated drum and the housing, and a centrifugal clutch having its driving member carried by one of the gears and its driven member attached to the line-spool arbor, substantially as described.

2. In a fishing-reel, the combination with a line-spool arbor and a spring-controlled drum, of a train of gearing having a fixed member, a compound gear, and an arbor carrying a rotary gear, a centrifugal clutch with one member mounted on the line-spool arbor and its other member attached to the arbor of the train of gearing, and a detent device adapted to engage with one member of the train of gearing, substantially as described.

3. In a fishing-reel, the combination with a line-spool arbor, and a train of gearing having an arbor, 39, in alinement with said line-spool arbor, of an automatic clutch having its driven member fast with the line-spool arbor and provided with a series of circumferential pins or studs and its driving member connected with the arbor, 39, and adapted to be thrown outwardly to engage with one or the other of said pins or studs, substantially as described.

4. In a fishing-reel, the combination with a reel-housing, a rotatable spring-controlled drum and a line-spool having its arbor extended into said drum, of a train of gearing one member of which is fixed to the housing and another member is carried by an arbor, 39, supported within the drum, a bridge-plate attached to the drum and provided with a disk-bearing, a driven clutch member attached to the line-spool arbor and provided with clutch pins or studs, an arm rigid with the arbor, 39, and a centrally-pivoted driving clutch member carried by the arm and adapted to engage with one of the pins on the driven clutch member, substantially as described.

5. In a fishing-reel, a bridge-plate provided with a disk-bearing, a slidable and rotary arbor mounted in said plate and bearing and provided with a gear-pinion and with a clutch-arm, a driving clutch member pivoted centrally to the clutch-arm and confined loosely between the latter and the disk-bearing, and a spring acting against said arbor, in combination with a line-spool arbor carrying a driven clutch member, a spring-actuated drum, and gearing, substantially as described.

6. In a fishing-reel, a spring-controlled drum provided with a fixed spindle, a compound gear loosely mounted thereon and a friction-disk supported by the compound gear-shaft and normally engaging with the compound gear, in combination with a line-spool arbor, a spring-actuated drum, a reel-housing, and fixed and rotatable gears mounted respectively on the reel-housing and a rotatable drum, substantially as described.

7. In a fishing-reel, the combination with a housing, of a fixed bushing thereon, a line-spool mounted at one end in the housing and having its other end provided with a spindle which extends through the bushing, a spring, a spring-actuated drum, and a clutch-controlled train of gearing between the drum and the line-spool arbor, substantially as described.

8. In a fishing-reel, the combination with a housing, a mainspring and a drum carrying a train of gearing, and a clutch mechanism, of a line-spool arbor poised within the reel-housing for free rotation therein and provided with an extended spindle on which is mounted a driven member of said clutch mechanism, and a manually-operative multiplying-gearing embodying clutch mechanism by which it may be thrown into and out of mesh with the line-spool, substantially as described.

9. In a fishing-reel, the combination with a reel-housing, of a fixed bushing, a line-spool supported at one end within the housing and provided at its opposite end with a spindle which is mounted for free rotation in the bushing and to have endwise thrust against the same, a spring-actuated drum connected to said housing, a spring attached at one end to the bushing and at its other end to the drum, a train of gearing having one member mounted on the bushing and its remaining members supported within the said drum, and a clutch mechanism between the line-spool arbor and one of the gears, substantially as described.

10. In a fishing-reel, a reel-housing, a bushing fixed to said housing, a spring-actuated drum operatively fitted to the housing and rotatably supported on the bushing, and a line-spool having its spindle supported rotatably in the bushing, in combination with a train of gearing, a mainspring and a clutch mechanism, substantially as described.

11. In a fishing-reel, a reel-housing and a bushing secured rigidly thereto and having a shouldered bearing and a threaded tenon, in combination with a line-spool having its spindle extended through the bushing, a mainspring attached to the bushing, a spring-actuated drum fitted to the shouldered bearing of the bushing, a train of gearing one member of which is fixed to the threaded tenon of the bushing to confine the spring-actuated drum against displacement, and a clutch mechanism, substantially as described.

12. In a fishing-reel, the combination with a spring-actuated drum and a train of gearing, of a pivoted detent for engaging with one of the train of gears, and a forked spring carrying a push-pin and having two arms which are arranged to engage with the detent on opposite sides thereof, substantially as described.

13. In a fishing-reel, a centrifugal clutch mechanism substantially as described comprising a revoluble disk having a series of studs or pins, a bridge-plate, and another member mounted loosely in the bridge-plate concentric with the axis of the revoluble disk and lying normally within the path of said studs or pins, the loose clutch member being moved centrifugally to engage with one of the studs or pins, substantially as described.

14. In a fishing-reel, a clutch mechanism substantially as described comprising a revoluble disk or plate having a series of studs or pins, an arbor mounted concentric to the axis of the disk and carrying an arm, and another clutch member pivoted centrally to the arm to lie normally in the path of the studs or pins and arranged to be thrown by centrifugal force into engagement with one stud or pin, substantially as described.

15. In a fishing-reel, the combination with a housing and a line-spool, of a slidable and rotary crank-shaft provided with the annular grooves and with a radial clutch-pin, a gear mounted on the housing independent of said shaft and provided with clutch pins or studs with which the radial pin of the shaft may engage, a spring acting against the shaft, a locking device mounted on the housing for engagement with the shaft, and a gear-pinion on the line-spool arbor, substantially as described.

16. In a fishing-reel, the combination with a line-spool arbor, a rotatable drum, and a fixed gear, of a shaft carrying a gear, a friction-controlled gear normally fast with said shaft and adapted to slip thereon under undue resistance, and clutch devices between the line-spool arbor and the friction-controlled gear, substantially as described.

17. In a fishing-reel, the combination with a line-spool arbor, a rotatable drum, and a fixed gear, of a spindle carried by said drum, a tubular shaft having a gear which meshes with the fixed gear, a loose gear on the tubular shaft, a friction-disk fixed to the tubular shaft and engaging with the gear to make the same normally fast with the tubular shaft, and clutch mechanism between the friction-controlled gear and the line-spool arbor, substantially as described.

In testimony that I claim the foregoing as my own I have hereto affixed my signature in the presence of two witnesses.

DUNCAN M. QUARLES, JR.

Witnesses:
CHAS. E. BERRY,
JOHN KELLY.